(12) United States Patent
Ford (10) Patent No.: US 6,307,657 B1
(45) Date of Patent: Oct. 23, 2001

(54) OPTOMECHANICAL PLATFORM

(75) Inventor: Joseph Earl Ford, Oakhurst, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/118,553

(22) Filed: Jul. 17, 1998

(51) Int. Cl.⁷ .............................. H04J 14/02; G02B 6/34
(52) U.S. Cl. ............................ 359/130; 359/131; 385/37
(58) Field of Search ........................ 385/37, 24; 359/124, 359/130, 129, 128, 127, 131

(56) References Cited

U.S. PATENT DOCUMENTS 6,011,884 * 1/2000 Dueck et al. ........................ 385/24

* cited by examiner

Primary Examiner—Jason Chan
Assistant Examiner—Christina Y Leung
(74) Attorney, Agent, or Firm—Reitseng Lin (57) ABSTRACT

An optomechanical platform that provides both precise alignment and ready manufacture of optical and optomechanical components. A simplified embodiment of the invention includes a substantially symmetric cylindrical tube with an optical device at one end of the tube, a grating at another, opposite end of the tube and optics disposed between. optomechanical/optoelectronic device that is particularly well suited to WDM and imaging applications. Included is an integrated optomechanical/optoelctronic device particularly well suited to imaging and Wavelength-Division-Multiplexed (WDM) applications.

9 Claims, 7 Drawing Sheets

OPTOMECHANICAL PLATFORM

TECHNICAL FIELD

This invention relates generally to the field of optical communications and in particular to an opto-mechanical platform suitable for Wavelength-Division-Multiplexed optical communications applications.

BACKGROUND OF THE INVENTION

Wavelength division multiplexing (WDM) has been shown as a promising approach for increasing the capacity of existing fiber optic networks. A communications system employing WDM uses plural optical signal channels, each channel being assigned a particular channel wavelength. In such a WDM system, optical signal channels are generated, multiplexed to form an optical signal comprised of the individual optical signal channels, transmitted over a single waveguide, and demultiplexed such that each channel wavelength is individually routed to a designated receiver.

The significance WDM communications systems and networks is immense. Consequently, a continuing need exists for apparatus and techniques that facilitate its continued implementation and adoption.

SUMMARY OF THE INVENTION

An advance is made over the prior art in accordance with the principles of the present invention which is directed to an opto-mechanical platform for WDM components.

Viewed from one aspect, the present invention is directed to an optomechanical platform that provides both precise alignment and ready manufacture of optical and optomechanical components. Specifically, a simplified embodiment of the invention includes a substantially symmetric cylindrical tube with an optical device at one end of the tube, a grating at another, opposite end of the tube and optics disposed between.

Viewed from another aspect, the present invention is directed to a method for fabricating the optomechanical platform. The method advantageously provides ready manufacture and ease of alignment of the of the components.

Viewed from yet another aspect, the present invention is directed to an integrated optomechanical/optoelectronic device that is particularly well suited to WDM and imaging applications.

BRIEF DESCRIPTION OF THE DRAWING

The teachings of the present invention can be readily understood by considering the following detailed description in conjunction with the accompanying drawing, in which:

FIG. 6($a$) shows a ray-trace diagram of an optomechanical platform incorporating the prism of FIG. 4 according to the present invention;

FIG. 6($b$) shows the relation of the prism of FIG. 6($a$) to a surface normal device according to the present invention;

DETAILED DESCRIPTION

A preferred embodiment of the invention will now be described while referring to the figures, several of which may be simultaneously referred to during the course of the following description.

Figure 1:
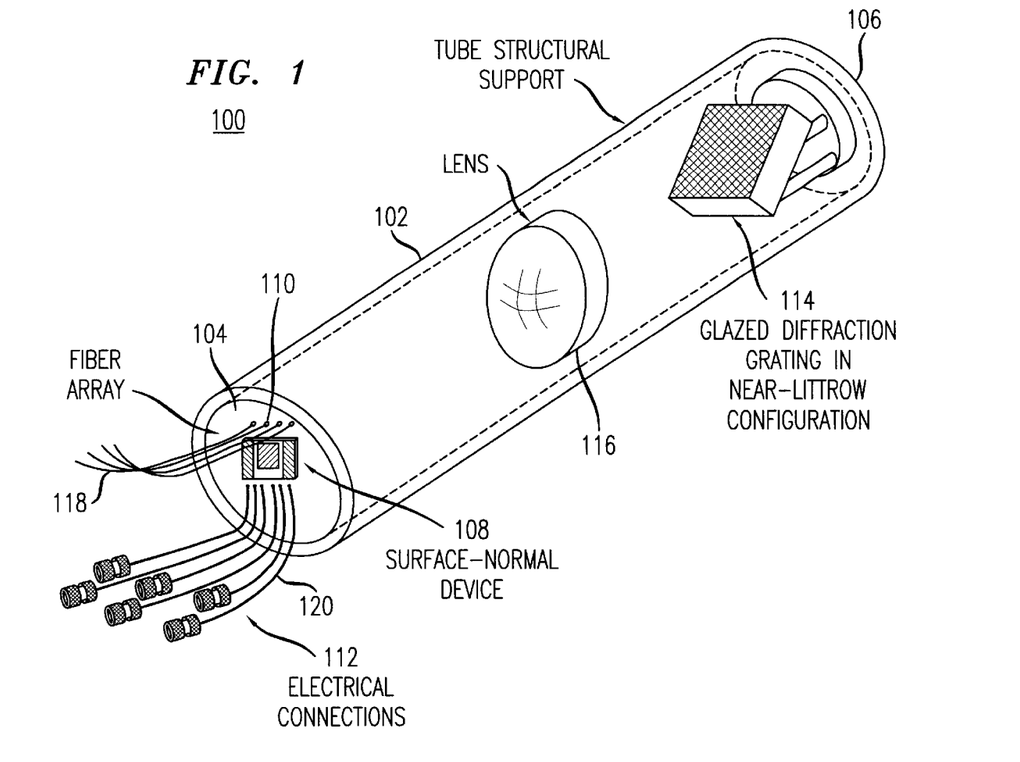
FIG. 1 shows an optomechanical platform according to the present invention.

With initial reference now to FIG. 1, there it shows a basic structure for an optomechanical platform which is the subject of the present invention. Specifically, optomechanical platform includes structural support 102 which is shown illustratively as having a substantially cylindrical shape. Consistent with this illustration, the support 102 has a near end 104 and a far end 106 in which optical and/or other components are positioned. In particular, and as shown in FIG. 1, far end 106 of structural support 102 houses a diffraction grating 114 which may serve so separate light impinging thereon into its component wavelengths.

At the near end 104 of the structural support 102 is shown an optical transmission system, which may include one or more fiber optic arrays 118 for conveying optical signals into and/or out from the optomechanical platform. A "surface-normal" device 108, such as an array of photodetectors having suitable electrical connections 120 is positioned at the near end 104 and additional optical elements, such as a lens 116 is positioned between the surface-normal device 108 and the grating 114 within the support 102.

Advantageously, one or more of the elements, i.e., the optical elements 116 or the grating 114 may be permanently affixed to the support 102 in a suitably-aligned configuration. In this exemplary embodiment, the surface-normal device 108 and the fiber optic arrays 118 are adjustably mounted so that they may be positioned relative to the other optical components such as the lens 116 and the grating 114. Of course, those skilled in the art will readily appreciate that the surface-normal device 108 and the fiber optic arrays 118 may be configured to adjust as a unit or independently of one another. That is, if they adjust as a unit, then their relative alignment to one another is fixed, while their alignment with the other optical components within the support 102 is advantageously adjustable.

At this point it should be clear to one skilled in the art how a device or system constructed according to the invention will operate. In particular, light traversing one or more of the fibers included in the fiber array 118 will enter the support 102 and proceed along an optical path that includes optical components within the support 102 such as the lens 116, the grating 114, through the lens 116 again and onto surface normal device 108. Signals resulting from the light impinging upon the surface normal device 108 propagate through electrical connections 112 to control electronics (not shown).

Using this "tube" geometry makes blind adjustment relatively straightforward. In fact, there are only a small number of orthogonal adjustments required: rotation of the grating orientation with respect to the device; tip and tilt of the grating to locate a central wavelength on the device; and focus of the lens (z-axis translation to adjust the gap between lens and device array).

Figure 2:
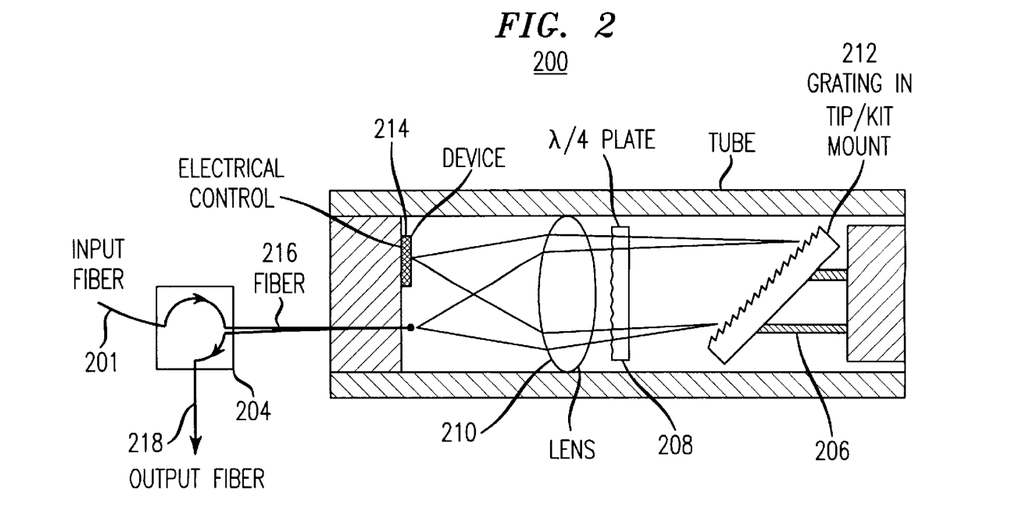
FIG. 2 shows an additional embodiment of an optomechanical platform according to the invention.

An important characteristic of my inventive optomechanical platform is that it permits light from an input optical fiber to be imaged onto a device, i.e., the surface-normal device, then be re-imaged onto the original input fiber or an alternative output fiber after reflection from the device. Advantageously, this imaging automatically compensates for any small misalignments of the components, especially if the device aperature is made larger than an illuminating optical spot. Such an examplary structure is shown in FIG. 2, where light entering via input fiber 201 is imaged onto surface normal device 214 after traversing lens, ¼ wave plate, grating 212. Reflected light likewise is re-imaged onto fiber 216 and separated through the action of circulator 204 such that it may be directed into output fiber 218. Also shown in this Figure is a tip/tilt mount 206 which alternatively allows the grating 212 to be adjusted relative to the whole platform 200.

Figure 3:
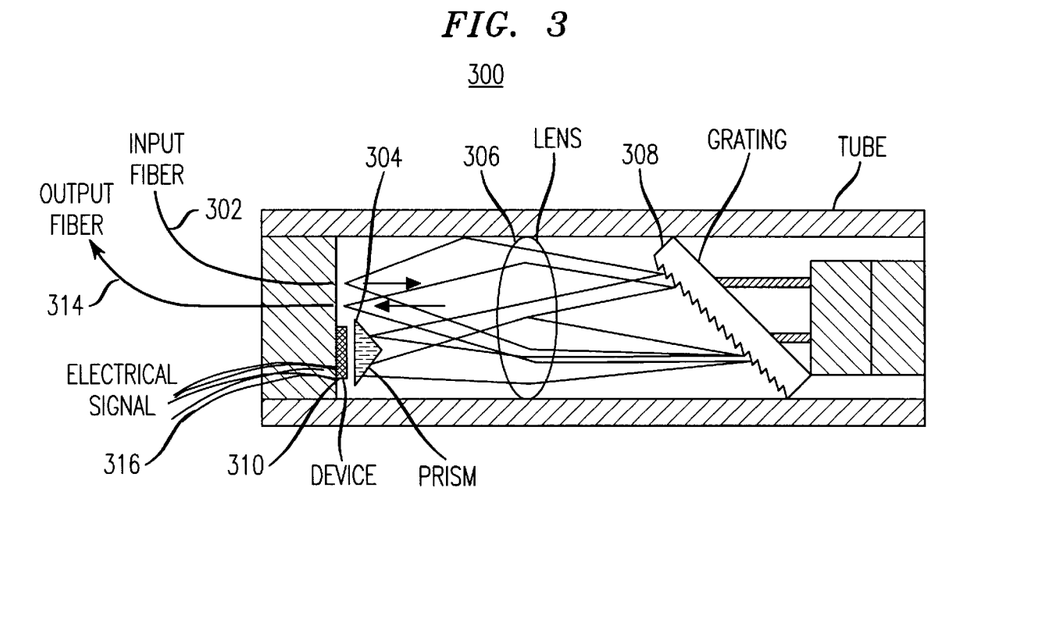
FIG. 3 shows an additional embodiment of the optomechanical platform according to the invention including optical translation element.

With reference now to FIG. 3, there is shown a further improvement to the optomechanical platform of the present invention. Specifically, a prism-like device 304 is introduced between the surface normal device 301 and other optical elements such as lens 306. Through the use of the prism 304, light input to the device is refracted (or partially defracted) by an input side prism before being reflected by surface normal device 310. The reflected light then passes through another refractive (or diffractive) beam deflector (which may be the same physical device such as the prism 304). The effect of this prism is that the reflected light is laterally shifted through its action. Consequently, an apparent source location of the imaged input light is laterally shifted. As can be now appreciated by those skilled in the art, if this lateral shift is appropriately designed, then reflected output light may be coupled into an output fiber 314 separate and distinct from an input fiber 302. Advantageously, such an improvement eliminates the need for the circulator shown in FIG. 2.

Figure 4:
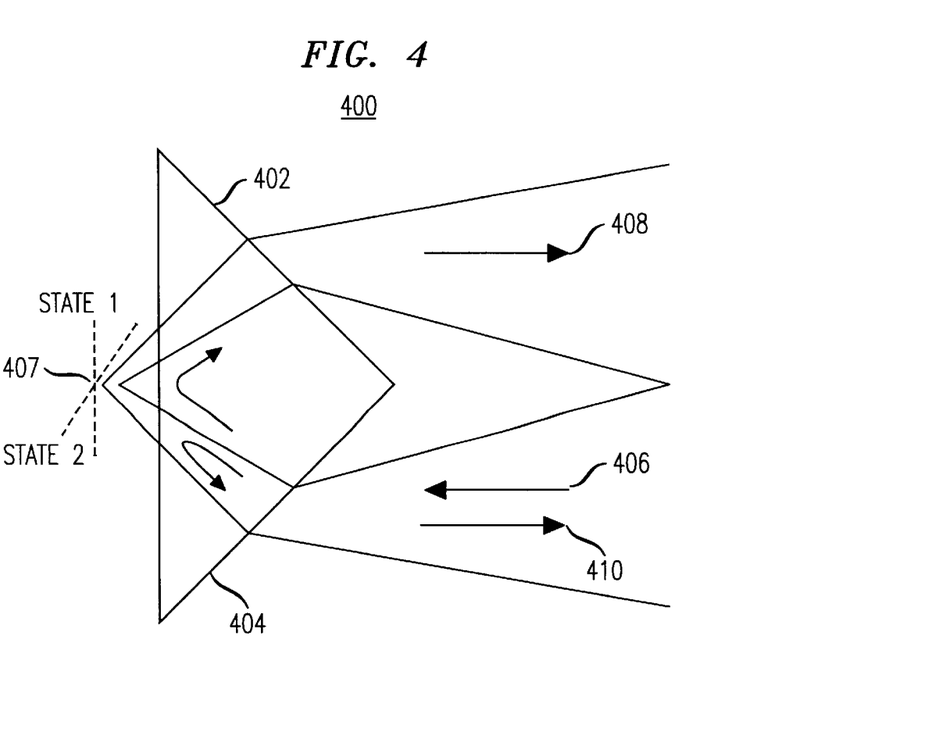
FIG. 4 shows a prism and movable mirror as applied to the present invention.

For the particular application of a WDM add/drop, FIG. 4 shows how the prism generally shown in FIG. 3 is used to illuminate a tilt mirror, which can direct the output to either of two facets, depending upon the orientation. Specifically, light 406 entering the prism through facet 404 is refracted to a point on the mirror 407 and then reflected out another facet 402 as exit light 408. Note that a translation of the light, i.e., the distance between the input facet 404 and output facet 408 occurs in this example. Alternatively, the tilt mirror 407 may be positioned such that the entering light 406 may enter and exit the same facet 404. Finally, note that the prism can be asymmetric with a different deflection angle for the two facets.

Figure 5:
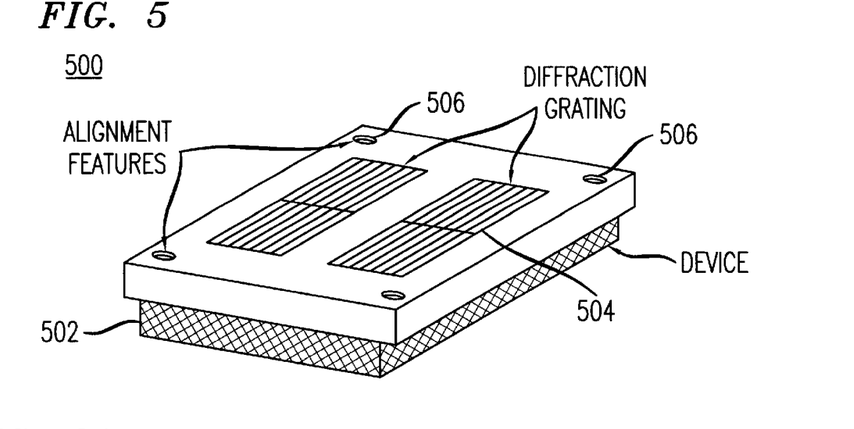
FIG. 5 shows an integrated device including optical and electro-optical elements according to the present invention.

In describing prism and device fabrication and alignment, optical components may be aligned and fixed to the surface of the device using any of a number of standard techniques for assembly including, but not limited to, flip-chip bonding of the device to a diffractive optical element as shown schematically in FIG. 5. In this inventive manner, alignment features are "manufactured" into both the device and the optical components.

With quick reference now to FIG. 5, there is shown a device 502 with optical elements, i.e., diffraction gratings 504 overlying the device and affixed thereto in a movable or adjustable manner. In this way, the compound device 500, which includes both optoelectronic components and optical components, are conveniently coupled yet variably adjustable relative to one another.

Those skilled in the art will of course recognize that widely known techniques, such as injection-molding, may be utilized to form a optical component such as a diffraction element having one or more diffractive prisms formed on a surface. This component may then coupled to an underlying active device. Advantageously then, the optical components serves as both an optical element and a "cover" that seals the active device from its environment.

Figure 6A:
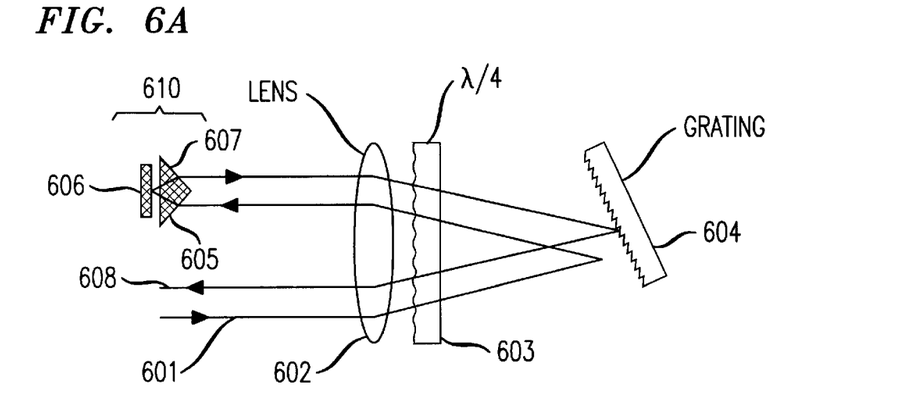
Figure 6B:
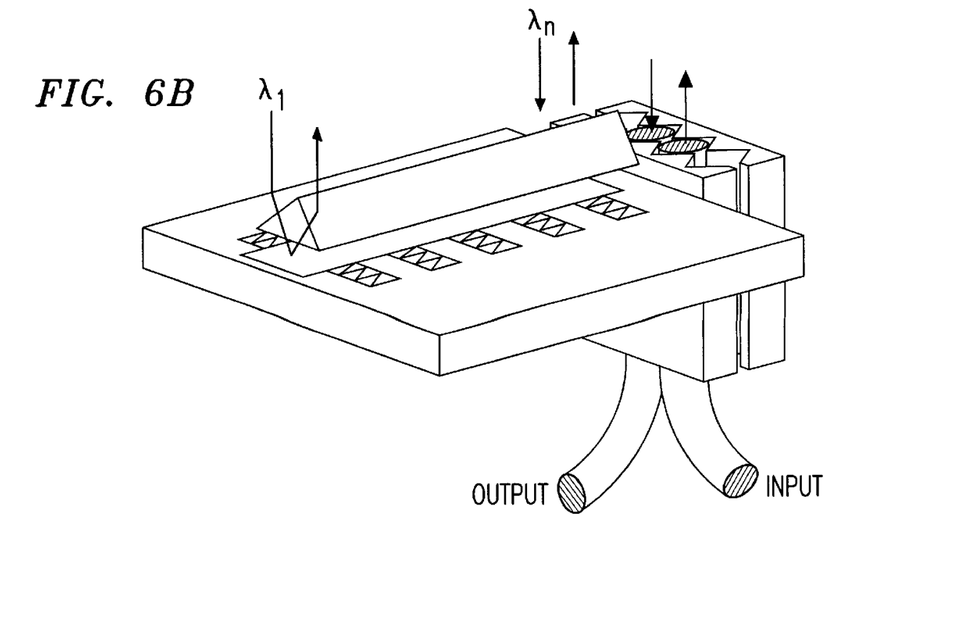

FIG. 6(a) shows schematically an optical path of my inventive device. In particular, input light 601 is optically treated by lens 602, ¼ wave plate 603 and grating 604 where it is reflected back through ¼ wave plate 603, lens 602 to input facet 605 of prism 610. The light input to the prism strikes device 606 and is reflected back out through prism 610 through output facet 607. As described previously, the translational difference between the light entering the prism input facet and the light exiting the prism output facet should be readily apparent. Upon exiting the output facet 607 of prism 610, the light traverses a reverse optical path through lens 602, ¼ wave plate 603, grating 604, ¼ wave plate 603, before exiting as light 608 which may be advantageously coupled into an output fiber (not shown). FIG. 6(b) shows an exploded view of prism 610 and device 606.

At this point it should be understood that my optomechanical platform and components provide a convenient, and readily manufacturable structure, particularly well suited for WDM applications. A key characteristic of the simplified structure shown in FIG. 1 is that the optical elements (lens, waveplate, grating, etc) are preferably fixed into the structural support which may advantageously be something as simple as a glass tube. As a result, alignment of the overall platform is performed by adjusting the device contained therein. This permits the use of a support tube having a minimal diameter, since no optomechanical a assembly (i.e., tilt/adjustment) is required. Of course, the tube may be made from material having a low thermal expansion such as Invar, glass or ceramic or it may be otherwise "athermalized" by using an appropriate combination of materials of differing thermal expansion.

The construction/alignment process may now be described. With initial reference to FIG. 7, starting with a support tube 701 which may preferably be made from metal, ceramic or glass, optical components such as a lens 702, ¼ wave plate 703 or grating 704 are inserted therein. The positioning of these optical components may be passive, that is, the placement may be determined by features formed into the tube, or spacer rings or through the use of an external jig. Of course, these elements may be fixed in place by epoxy, sintering or other bonding means or a mechanical apparatus such as a ring or strap around the outside of the tube.

Figure 7:
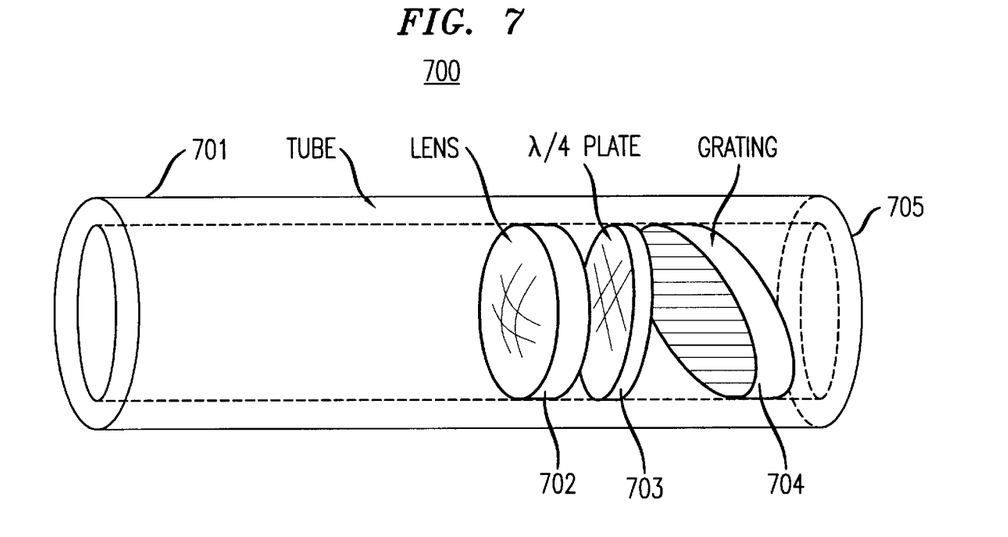
FIG. 7 shows a preliminary assembly of an optomechanical platform according to the present invention.

Note that in FIG. 7 no dimensions are shown and that the lens may be positioned closer to the grating (so that the grating is not in the lens back focal plane). This may reduce maximum device coupling, since it is no longer exactly telecentric, while increasing alignment stability.

Figure 8:
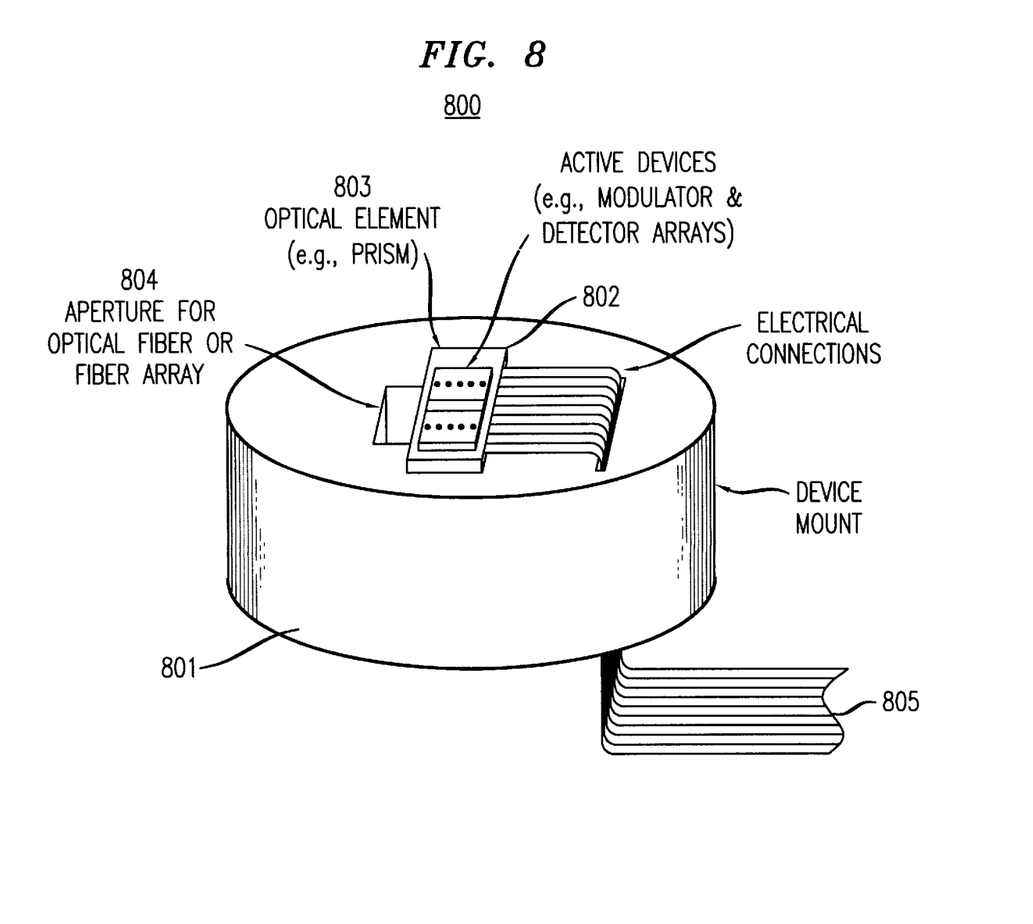
FIG. 8 shows an optical/optoelectronic subassembly for incorporation into the optomechanical platform of FIG. 7.

Next, and with reference now to FIG. 8, there it shows a device mount 801 including one or more active devices 802, optical elements 803 overlying the active devices 802, aperture 804, for optical fibers or fiber array and input/output electrical connections 805. Generally, the optical fiber is not fixed. It is left free to move. If desired, the optical elements 803, such as refractive or diffractive prisms, may be mounted on the active device 802 before it is mounted. For example, the optical elements 803 may be integrated into the active device by etching it into the device substrate or by flip chip bonding of a separate optical element onto the device.

It is also possible to place optical elements 803 onto the devices after they have been mounted, for example, by forming suitable alignment features into the device, the mount or both.

The device mount is inserted into the support assembly of FIG. 7. Note that the relative rotational alignment of the device arrays with the grating orientation may, advantageously, be relatively loose, in which case a passive alignment to a fixed feature in either the device mount or support or some external jig will suffice. Similarly the focus (separation between the device and lens) may be amenable to passive alignment depending upon lens focal length and device specifics.

Final alignment is active, and uses movement of the fiber/fiber arrays within the device. Specifically, a fiber element is positioned using an external, high resolution translation/rotation stage while actively monitoring fiber throughput and/or device operation. After the fiber/fiber arrays is initially positioned, it is moved to a position where optimum performance is obtained. Then, it is fixed in place by any of a variety of methods, including, but not limited to, epoxy, laser welding, sintering, solder hardening, mechanical clamp, etc. A principle benefit to my inventive approach is that expensive optomechanical elements are external to the package, i.e., translation equipment, electrical control equipment, light source, light detectors, etc., and may be re-used for other, subsequent assemblies.

Additionally, and as can be readily appreciated by those skilled in the art, the alignment may be over multiple-axis with optical fiber held in a suitable mount—such as a silicon v-groove array thereby limiting the degrees of freedom (such as rotation, yaw and pitch) which may advantageously controlled without active alignment. For example, a component such as a WDM equalizer component or WDM monitor component (or both) where a pitch of the detectors/ modulators is small compared to the pitch of the communications wavelengths.

Figure 9:
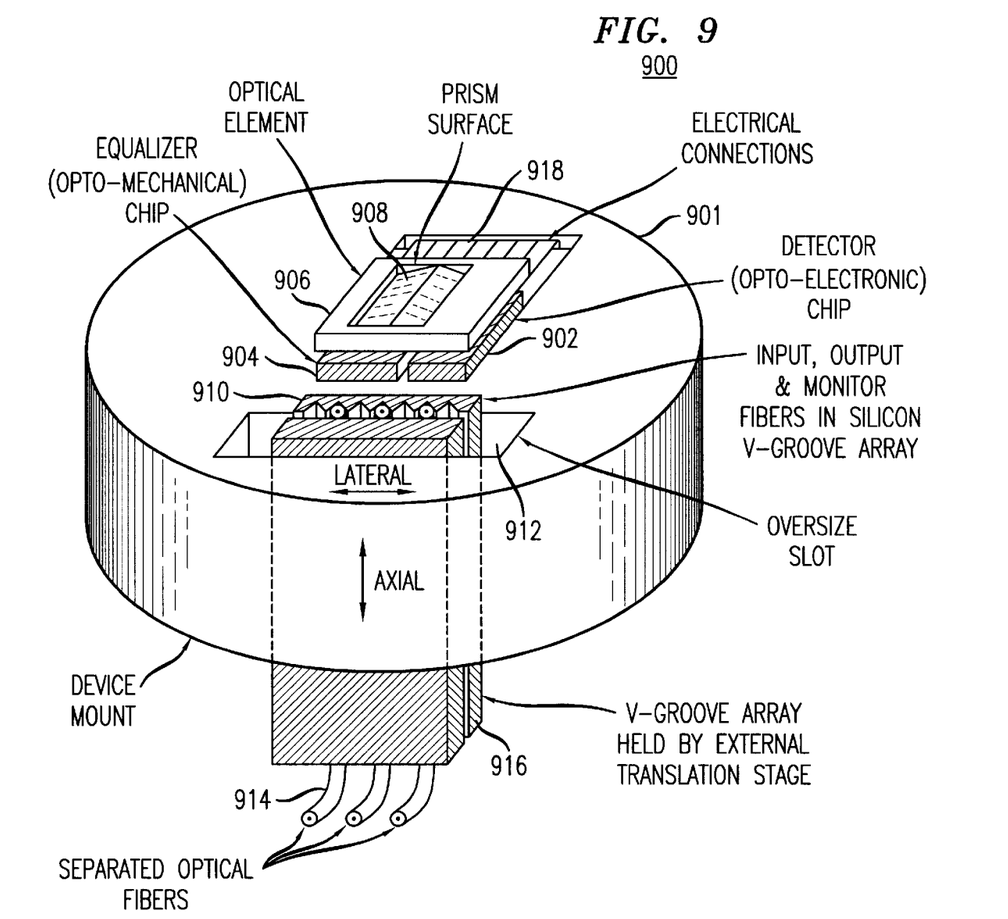
FIG. 9 is an alternative integrated device of FIG. 8.

With reference now to FIG. 9, there it shows a WDM equalizer/monitor structure 900 constructed according to the present invention. Specifically, device mount 901 has attached thereto one of a variety of detectors (optoelectronic chip) 902, an equalizer 904 having an optical element 906 affixed thereto. As previously described, the optical element 906 may advantageously include one or more prisms or arrays of prisms 908 which function as previously described. This detector 902 and equalizer 904 assembly are electrically and logically connected to one or more control elements (not shown) by electrical connections 918.

With continued reference to FIG. 9, a fiber aperature 912 is shown which is positioned a fiber array 910. Advantageously, the fiber array 910 contains both input and output fibers and the array 910 is preferably movable in both lateral and axial directions. As will be readily appreciated by those skilled in the art, the fiber array 910 may have v-shaped groves which act to secure optical fibers therein.

In the case of the example structure of FIG. 9, an input fiber (within the fiber array 910) carries a multiwavelength signal which is distributed over the optomechanical equalizer chip 904 after passing through a prism 908. The signal is reflected (transmitted through an adjacent prism window) and collected into a separate output fiber (contained within the fiber array 910). The output signal is externally tapped by, for example, a fused fiber 1% coupler) and then fed back into the device 900 by yet another fiber (contained within the fiber array 910) and subsequently distributed over a multichannel optoelectronic power meter.

Advantageously, the alignment of such a component is eased by fabricating modulator and detector devices with oversize apertures. Most of the alignment is already done when the components is assembled. As described herein, a final alignment only requires as few as two adjustments—a lateral translation of the fiber array to alin the wavelength dispersed columns onto the corresponding device arrays and an axial focus to provide suitable coupling efficiency. If rotation of the device relative to the grating is needed, then this may be performed by rotating the entire subassembly 900 before fixing it into the support of FIG. 1.

Figure 10:
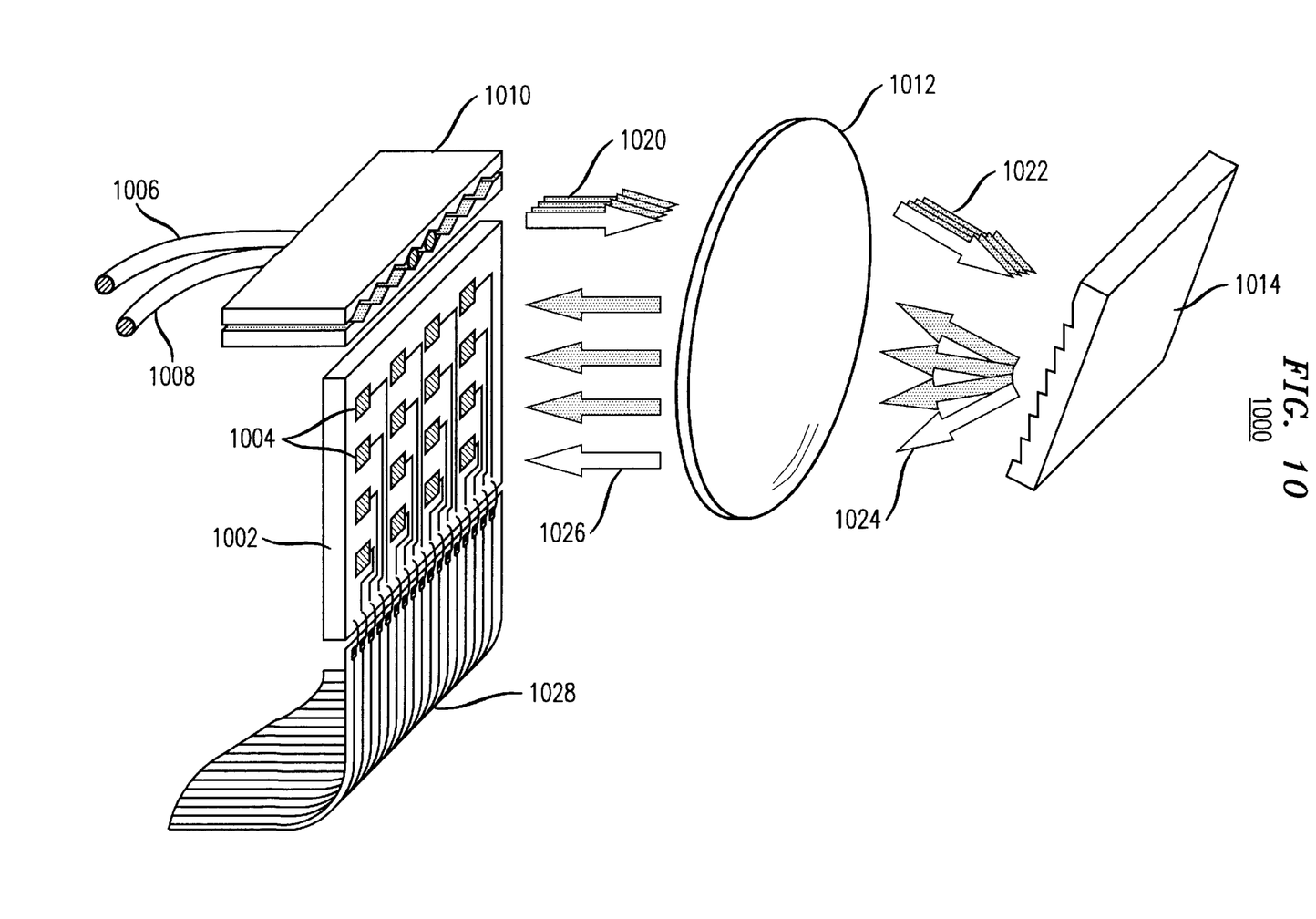
FIG. 10 shows an optomechanical imaging WDM platform according to the present invention.

With reference now to FIG. 10, there is shown how my invention may advantageously be used in a WDM system. Specifically, light carried over input optical fiber 1006 and affixed within optical fiber array 1010 exits the input optical fiber 1006 as beam 1020 having multiple wavelengths. The light then propagates through lens 1012 where it becomes focused beam 1022 that impinges upon grating 1014. The action of the grating is such that the light is split into component wavelengths 1024 and then focused by lens 1012 into focused component wavelengths 1026. Advantageously, and in a preferred embodiment, each one of the individual wavelengths will strike an individual detector 1004 of device array 1002. As should be apparent, and in this preferred embodiment, light from a single, particular input fiber may be coupled to a particular row of detectors which are part of the device 1002. Electrical signals resulting therefrom may be conducted via ribbon conductor 1028 for action by external control electronics.

Figure 11:
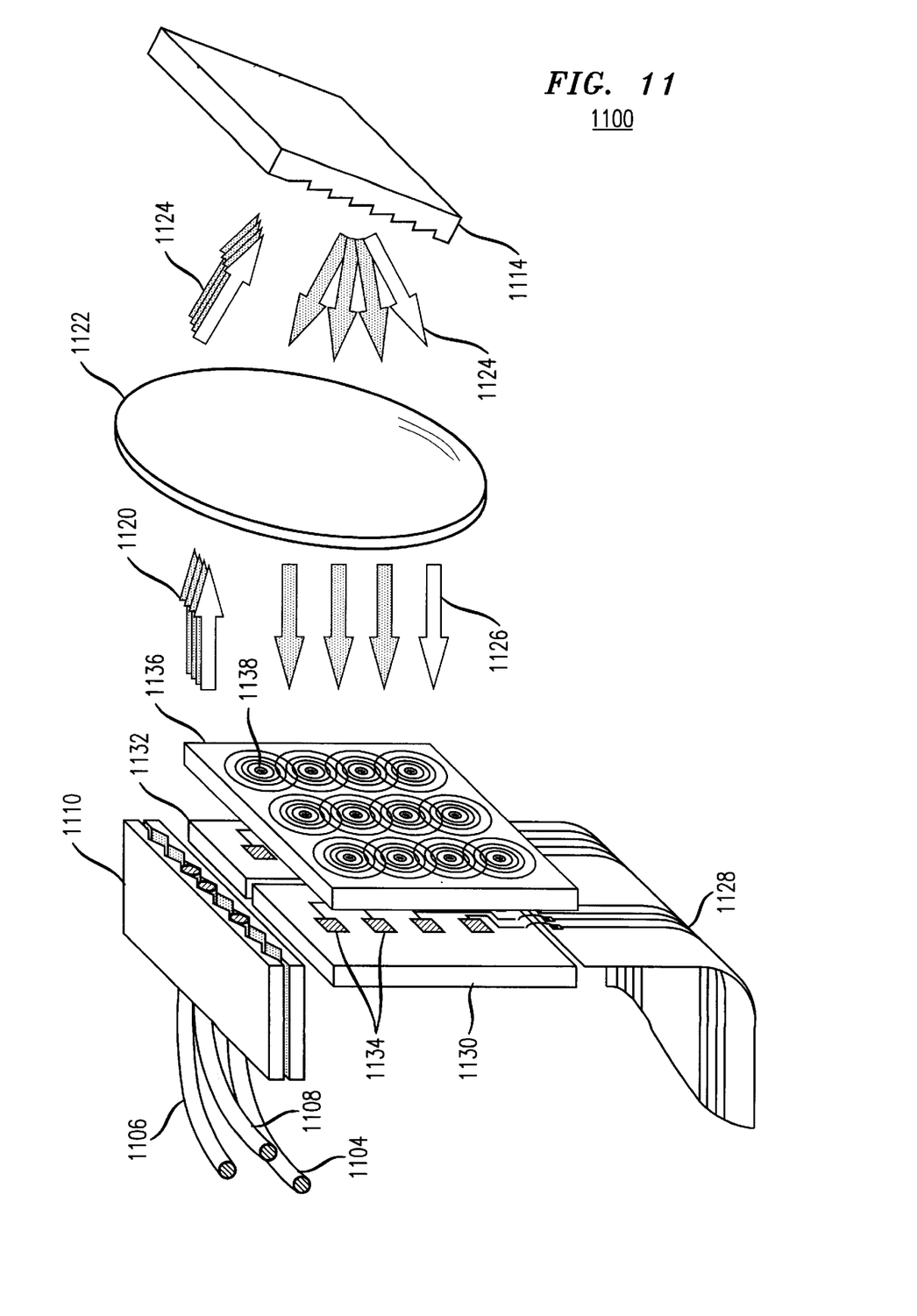
FIG. 11 shows an alternative optomechanical WDM platform according to the present invention.
Figure 12:
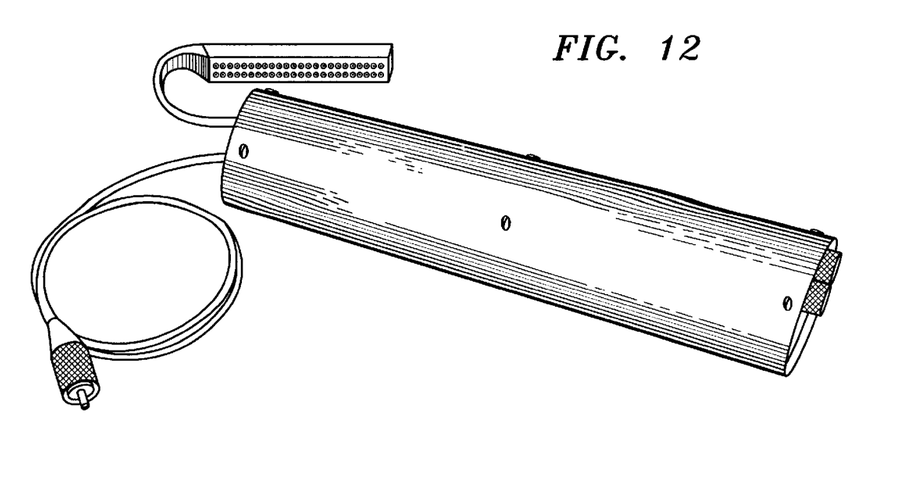
FIG. 12 is a photograph of a prototype optomechanical platform according to the present invention.

FIG. 11 shows a further embodiment of my invention, specifically a WDM system that incorporates my inventive prism described previously. The configuration is similar to that shown in FIG. 10, with the addition of an optical element 1136, including array of prisms or other translation elements, overlying devices 1130, and 1132 which may optionally include detectors 1134, equalizers, modulators or combinations thereof. As should be apparent from previous discussions, the optical element 1136 may serve translate light reflected from a surface normal device such that it may be later directed to another device or another element of the same device.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

What is claimed:

1. An optomechanical platform for operating on a broad spectrum input signal carried on an optical fiber comprising:
   a means for providing the broad spectrum input signal in a 1-D array;
   a means for substantially collimating the broad spectrum input;
   a means for diffracting the collimated broad spectrum input into a distinct angle such that the diffracted light is directed through the collimating means a second time and onto a means for operating on the light; and
   the means for operating on the light which receives the light after it passes through the collimating means the second time, the light operating means including a means for selectively reflecting some or all of the light back into the collimating means, while affecting either the amplitude or phase of the reflected light.

2. The optomechanical platform of claim 1 wherein the reflected portion retraces the path of incident light.

3. The optomechanical platform of claim 2 wherein the selectively reflecting means is aligned by moving an input fiber relative to a device submount, prior to being fixed in place.

4. The optomechanical platform of claim 3 wherein the collimating means includes discrete, bulk optical elements or micro-optical elements integrated directly with an active device.

5. The optomechanical platform of claim 2 wherein the reflecting means selectively reflects portions of the optical signal according to optical wavelength and transmitted portions of the optical signal are directed into a means for receiving the transmitted signal situated beneath an active device, said receiving means comprising an array of detectors, optical fibers, and integrated optical waveguides.

6. The optomechanical platform of claim 1 wherein the reflected portion does not retrace the path of incident light.

7. The optomechanical platform of claim 4 wherein the selectively reflecting means is aligned by moving an input fiber relative to a device submount, prior to being fixed in place.

8. The optomechanical platform of claim 6 wherein the collimating means includes discrete, bulk optical elements or micro-optical elements integrated directly with an active device.

9. The optomechanical platform of claim 6 wherein the reflecting means selectively reflects portions of the optical signal according to optical wavelength and transmitted portions of the optical signal are directed into a means for receiving the transmitted signal situated beneath an active device, said receiving means comprising an array of detectors, optical fibers, and integrated optical waveguides.

* * * * *